Feb. 24, 1970     D. C. KETNER     3,496,941
SUN-BATHERS REFLECTOR DEVICE
Filed Nov. 14, 1966     2 Sheets-Sheet 1
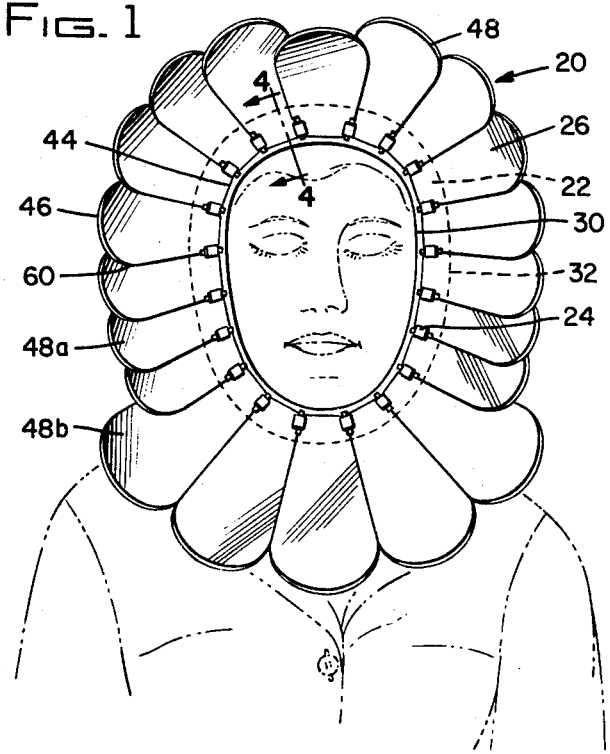
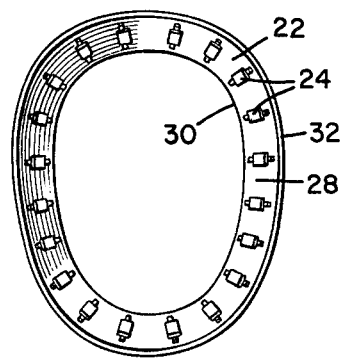
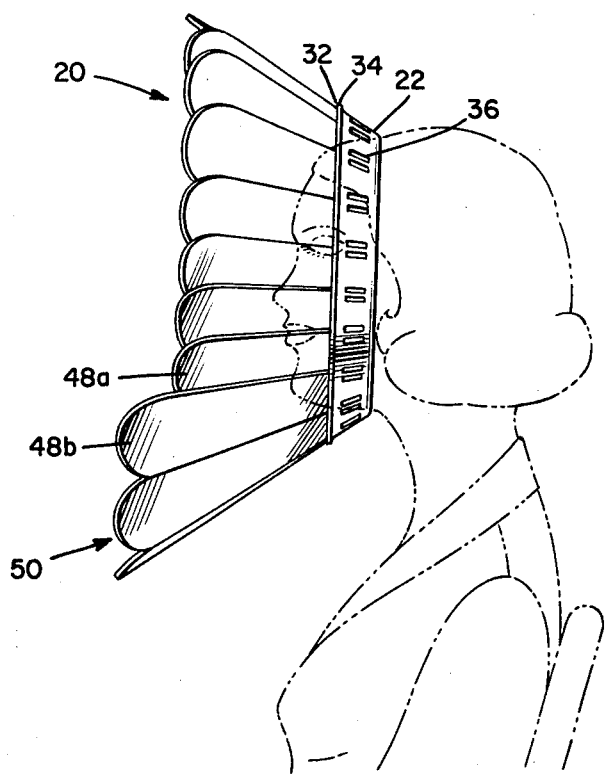
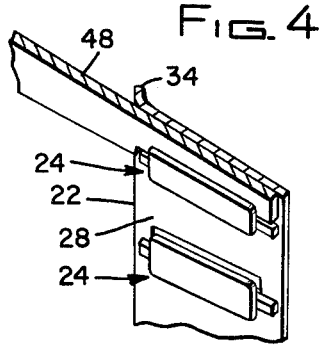

Feb. 24, 1970
D. C. KETNER
3,496,941
SUN-BATHERS REFLECTOR DEVICE
Filed Nov. 14, 1966
2 Sheets-Sheet 2
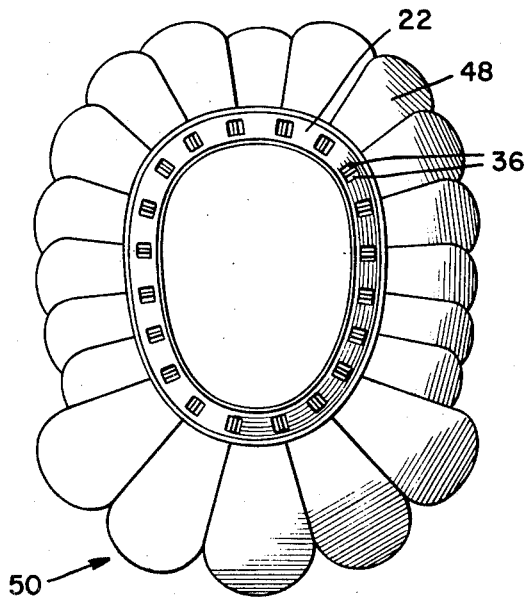
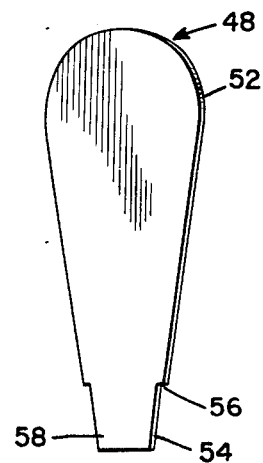
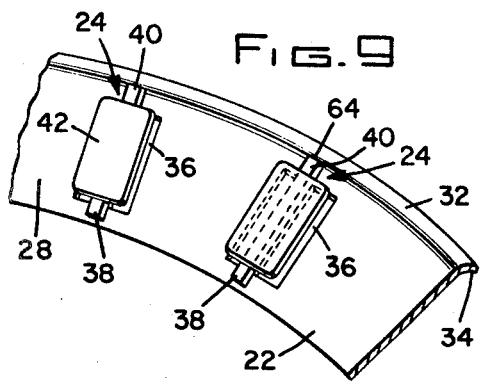
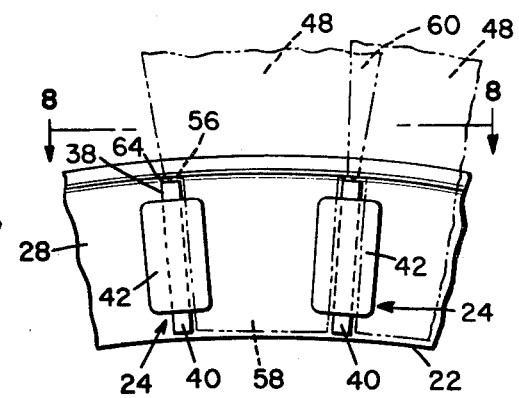
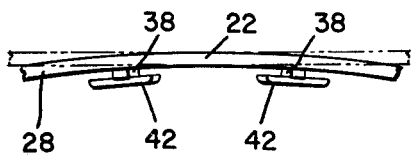

United States Patent Office 3,496,941
Patented Feb. 24, 1970

3,496,941
SUN-BATHERS REFLECTOR DEVICE
David Clough Ketner, 108 E. 82nd St.,
New York, N.Y. 10028
Filed Nov. 14, 1966, Ser. No. 593,780
Int. Cl. A61n 5/06
U.S. Cl. 128—372                    11 Claims

ABSTRACT OF THE DISCLOSURE

A sun reflector device formed from a plurality of flat reflecting surfaces that provides an ovate opening for fitting the face of the wearer with the reflecting surfaces in corolla-like arrangement so that when the device is positioned on the face of the wearer the reflecting surfaces direct and concentrate sun rays over that part of the face that protrudes through the ovate opening, thereby effecting a rapid and even tanning of the wearer's face.

---

This invention facilitates sun-bathing of the entire face so as to intensify the effects from the sun when the sun's rays are not as strong as desired. With it, in the summer one can quickly obtain an even sun-tan over the entire face at once. In winter and summer, even with a wan sun, one can in a reasonably short period, obtain a healthy and attractive tan over the entire face.

The reflector device of this invention provides a large area of intercept of the sun's radiant energy. It provides reflector surface petals that slant forward at a great enough angle to reflect much of the received radiant energy onto the face (since reflecting it out forward of the face accomplishes no useful purpose). All this requires a large, deep dished structure. This invention gives a reflector of the above-indicated characteristics for use which can be mailed flat and be easily assembled by the user. Also, when it is damaged, it can have its damaged parts readily replaced by anyone with virtually no skill or effort. At the same time, this invention provides a varied and overlapping pattern of reflection that will vary a little with each small motion of the wearer, thus avoiding fixed hot spots.

The present invention contemplates a sun-tanning reflector device in which a molded frame or the like adaptable for positioning about the face is provided with a plurality of reflector surfaces supported thereon around substantially the full periphery of the frame so that when it is positioned about the face radiant energy from the sun is directed in an overlapping pattern simultaneously over the entire face, thereby tanning the face at once in an even and continuous manner.

Advantageously, the petals may be in permanent attachment to the frame, such as by molding, fastening, and the like so that in storage and shipment of the device a plurality of them can be nested together because of their dished configuration.

The invention utilizes a molded flexible frame which provides integral grips for the feet of reflector surface petals and a circumferential series of reflector surface petals having feet that fit readily into the frame grips and are held in place thereby. The dished configuration of the frame (which technically is a frustoconical shell ring) facilitates at once the requisite forward slant of the reflector petals and the removable gripping of their feet.

The molded flexible frame encircles the face and provides for a quick and convenient surrounding of the face with an assembly of detachable reflector surface petals correctly slanted so as to provide for the reflecting of the sun's radiant energy in the form of solar rays onto the face from around substantially 360° of arc and thereby an even all around tan of the surface of the face at one sitting. The petal attaching or gripping means retain the petals in their proper flat reflective position on the frame and at correct outwardly dished relation to the facial surface of the user so as to direct the solar rays in a substantially even distribution over the entire face. The attaching means for holding the petals in their proper relationship in the frame may be formed in the frame during its molding which makes for a simplified construction or they may be attached thereto or otherwise formed thereon. It will be appreciated that the attaching means provides for the assembly of the reflector petals in their proper position and relationship to each other and to make the device capable of being extendible to capture the radiant energy when in use and small and compact for carrying or transporting it when not in use and thus enhancing its utility.

Advantageously, this device provides a reflective surface from a plurality of assembled, individual petals each being a reflector surface so positioned as to provide a corolla of discrete reflective surfaces which completely ring the face and directs the impinging rays onto the surface of the face in an even, and concentrated manner. It has been found that this unique assembly of reflector surface petals provides interception of the solar rays in such a manner that they are efficiently directed about the entire face in a beneficial overlapping pattern thus providing a quick and efficient tanning. When the treatment of the face has been completed, the device can be easily disassembled and placed in a flattened, compacted form for carrying or shipping thus increasing its value and use.

Other objects and advantages of this invention will become apparent from the appended drawings of an embodiment of the invention, shown by way of illustration only, in which:

FIGURE 1 is a front view in elevation of the reflector device in position encircling the periphery of the face of a wearer shown in broken lines;

FIGURE 2 is a side elevational view of the reflector device in place about the face of a wearer shown in phantom and broken lines;

FIGURE 3 is a front view of the frame with the gripping means therein for holding the reflector surface petals in their proper position;

FIGURE 4 is an enlarged elevational view of a fragmentary portion of the reflector device taken along line 4—4 of FIGURE 1, with only the petal at the section line being shown;

FIGURE 5 is a rear view of the reflector device shown in FIGURES 1 and 2;

FIGURE 6 is a view in perspective of one of the reflector surface petals shown in FIGURE 1;

FIGURE 7 is a front view of a portion of the frame showing in broken lines portions of two reflector petals held in place by gripping means on the frame;

FIGURE 8 is a view of the portion of the frame only, shown in FIGURE 7 taken along line 8—8 showing the gripping means and in broken lines the frame when flexed to permit insertion of the petal foot in the gripping means; and FIGURE 9 is a view in perspective of a portion of the front of the support frame indicating in broken lines details of the gripping means or grips.

Referring to the drawings, numeral 20 relates to the reflector device of this invention having a peripherally complete supporting base or frame 22, a circumferential series of spaced clamping jaws 24 formed thereon, and a peripherally complete reflector surface 26 which surface is detachably retained on the frame by the jaws.

Frame 22 is a frustoconical shell ring having a concave outwardly dished surface 28. The frame is of molded material, thin and resiliently bendable to facilitate its flexing so that the reflector surface 26 can be easily assembled to the frame, and the frame may be brought into quick and comfortable engagement with the face along its inner circumference 30 thus providing for retension and proper positioning of the reflector device. The frame may be made of any material such as cardboard, plastic or any other material which provides for its flexible nature. Frame 22 has outer circumference 32 which is turned outwardly to form a rim or lip 34 which provides stability to the frame. The surface of the frame defines a plurality of equally spaced pairs of spaced rectangular apertures or openings 36.

Positioned on the outwardly dished surface 28 are a plurality of radially positioned spacer bars or lands 38 which extend for substantially the width of surface 28 and cover the space between pairs of apertures 36 thus providing a raised bar surface 40. Integral with the bar surface 40 are rectangular plates 42 which form an overhang extending out to both sides thereof. The plates 42 are parallel to and spaced from surface 28 and each substantially covers the area of a pair of the apertures 36 thus forming with surface 28 a plurality of spaced clamping jaws providing gripping surfaces for holding the reflector surface 26 in its proper position on frame 22.

The reflector surface 26 has substantially complete inner and outer perimeters 44 and 46 and is constructed from a plurality of separate but contiguously placed reflector surface petals 48 arranged around the circumference of the frame in the form of a corolla in which some of the petals overlap to provide a total reflector surface which has a partially stepped surface construction.

Petals 48 have generally similar contours and are of two sizes. The smaller size petals 48a are arranged on frame 22 about the upper, right lateral and left lateral parts of the face and the larger size petals 48b about the lower parts of the face. Each petal is formed from flat, thin material such as cardboard, plastic, light metal or the like material so as to make the petal capable of reflecting solar rays onto the skin as, for example, a cardboard backing having an outer layer of aluminum foil.

The larger size petals 48b are extended out beyond the smaller size petals about the lower and lower lateral portion of the face and frame to form a bib-like extension 50. This extension intercepts and reflects increased amounts of radiation to downwardly directed surfaces of the face tending thereby to equalize the solar energy received over the entire face.

Advantageously, the petals can be tapered from a wider outer end 52 to a narrower inner end 54 and are provided with small shoulders or stops 56 which terminate in a wedge-shaped foot 58. The outer ends of the petals are wide so that a total reflective surface area in closed conical-like shell ring form is provided by a radial assembly of all the petals.

Advantageously, the reflector surface petals extend in a clockwise and counter-clockwise shingle-like arrangement of downward and outward overlaps or steps 60 from the top center of the frame to the sides of the chin providing the reflector surface with a stepped surface about the upper and side areas of the face. It will be appreciated that the overlaps cause the petals to be slightly tilted in their transverse direction with respect to the frame which aids in efficiently directing and reflecting the rays onto the face. Thus the overlapped small petals in combination with the large petals which are in substantially edge to edge abutment provide about the face a bowl-like or dished reflective surface area of individual flat reflector surfaces capable of reflecting a high degree of the received rays in large pattern arrangement onto the face and thereby intensifying the tanning effect on the skin in a short period of ray exposure.

It will be appreciated that the frame has a dished surface so flattening part of the same moves the jaws apart, coming back to closer spacing when released, to grip the petal feet 58, which are proportionally shaped for a snug fit between the jaws and are of a thickness fitting between the plates 42 and the surface 28. The small shoulders 56 of the petals act as stops properly positioning the petals in the jaws by abutting tips 64 of the spacer bars. It will be understood that the petal feet when inserted in the clamps are thereby gripped primarily depthwise, that is flatwise, between the concave front side of the frame and the overhang of the plate and are controlled from sidewise movement by the bars which space the plates from surface 28.

It will be understood that the petal foot is an integral continuation of the petal body all being of stiff but bendable sheet material and the fit of the foot being snug when that part of the frame is held flat, so when it returns to arc (as part of its dished shape) it grips the petal transverse of its length to hold the same stiffly out. The petal being stiffly bendable, if the petal is bumped, it bends over a little and noes not entirely collapse or break off.

It also will be appreciated that a variety of other types of petal holding means may be used to retain the reflector petals on the frame such as clips, snaps, pins and the like.

In use the reflector device is assembled by inserting the proper size petals one at a time into the jaws of the frame. This is done by bending the frame to open the jaws and inserting the petal foot between the gripping surfaces with the reflective surface directed inwardly or by bending the petal foot and inserting it into the gripping means to be clamped thereby. When all of the petals are secured to the frame, the assembly forms a peripherally complete conical-like reflective surface extending in dished, bowl-like manner about and beyond the frame. To disassemble the reflector device, the wearer need only pull each petal out of the jaws slightly bending the frame to remove the gripping tension or by bending the petal foot, when the petals can be stacked flat like a deck of cards thus protecting the reflector surface during carrying or shipping of the device.

What is claimed is:

1. A sun-tanning face reflector device comprising a peripheral frame defining an ovate opening therein, and a corolla of reflector petals removably and replaceably held therein, the frame being resiliently bendable, jaws formed on the frame, and the petals having feet shaped to fit between the jaws and proportioned so the jaws in their rest position clamp them.

2. The reflector device of claim 1 in which the frame has a dished surface so that flattening part of the same moves the jaws apart, coming back to closer spacing when released.

3. A sun reflector device for tanning the face comprising a plurality of inter-connected reflective surfaces, each of said surfaces being angled with respect to each other and having a petal-like configuration that presents a deep dish-like structure, said surfaces extending from a peripheral frame defining an ovate opening that fits the face when assembled about the face of the wearer so that each surface presents a different reflective angle of the sun's rays towards the face thereby distributing them over the entire surface to produce an even tanning of the face.

4. A sun reflector device for tanning the face of a wearer comprising a frame support means defining an ovate opening therein for fitting the face of a wearer and a plurality of flat reflector surfaces supported by said frame, said reflector surfaces projecting radially outward from the frame in bowl-like reflector arrangement, so that when the device is positioned on the face of a wearer radiant energy impinging on the reflecting surfaces is directed inwardly over the exposed portion of the face protruding through the ovate opening to effect a rapid, even tanning of the surface of the face exposed within the device.

5. The reflector device of claim 4 in which the support means is an outwardly dished frustoconical shell ring having an ovate opening therein and having means for maintaining said reflector surfaces when in position about the face slanted outwardly from the face around substantially its full periphery so that radiant energy impinging on it is directed only to the face from around substantially the full perimeter thereof.

6. The reflector device of claim 4 having a plurality of attaching means detachably holding said reflector surfaces in the frame in a bowl-like position about the face.

7. The reflector device of claim 6 in which the reflector surfaces have means for locking them in the attaching means to form the assembled bowl-like reflector arrangement.

8. The reflector device of claim 7 in which the reflector surfaces have notched feet adapted to engage said attaching means.

9. The reflector device of claim 8 in which the attaching means comprise a plurality of gripping surfaces spaced circumferentially about the frame for frictionally engaging and holding the feet of said reflector surfaces to position them radially about the frame.

10. The reflector device of claim 4 in which a portion of the reflector surfaces are longer and extend outwardly for a greater distance when in position about the face to form a bib-like extension under the chin.

11. The reflector device of claim 4 in which portions of the reflective surfaces are overlapped clockwise and a portion overlapped counter-clockwise from the top of the vertical centerline of the device when in position on the face.

References Cited

UNITED STATES PATENTS

| 1,974,820 | 9/1934 | Krell | 128—395 |
| 1,998,121 | 4/1935 | Dobrusskin | 128—372 |
| 2,626,609 | 1/1953 | Friedberg | 128—395 |
| 2,981,256 | 4/1961 | Besnah | 128—372 |
| 3,064,534 | 11/1962 | Tumavicus | 343—915 XR |
| 3,176,303 | 3/1965 | Holland | 343—915 |
| 3,383,115 | 5/1968 | Eckley et al. | 277—192 XR |

FOREIGN PATENTS 570,517  12/1957  Italy.

RICHARD A. GAUDET, Primary Examiner

K. L. HOWELL, Assistant Examiner

U.S. Cl. X.R.

128—375, 395